J. J. VISTE.
TRANSMISSION MECHANISM FOR TRACTORS.
APPLICATION FILED OCT. 30, 1914.
1,158,087.
Patented Oct. 26, 1915.
3 SHEETS—SHEET 1.
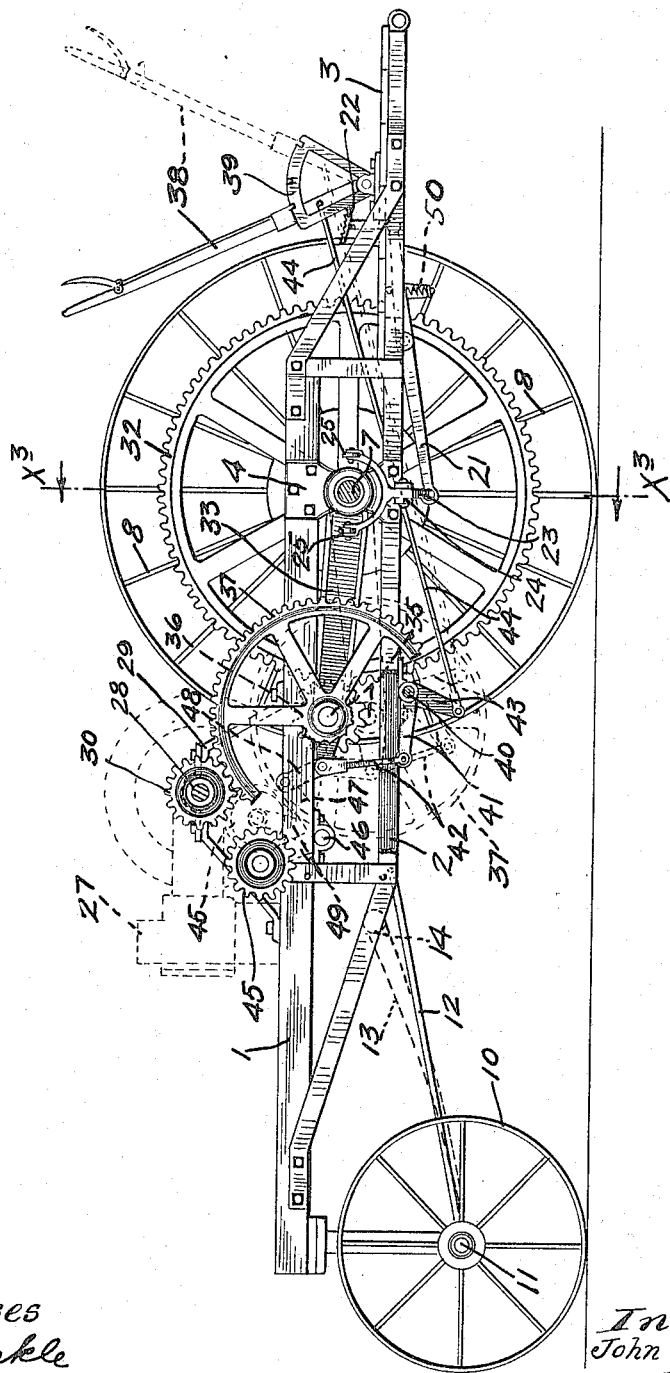
Witnesses
E. C. Skinkle
A. H. Opsahl
Inventor
John J. Viste
By his Attorneys
Williamson & Merchant

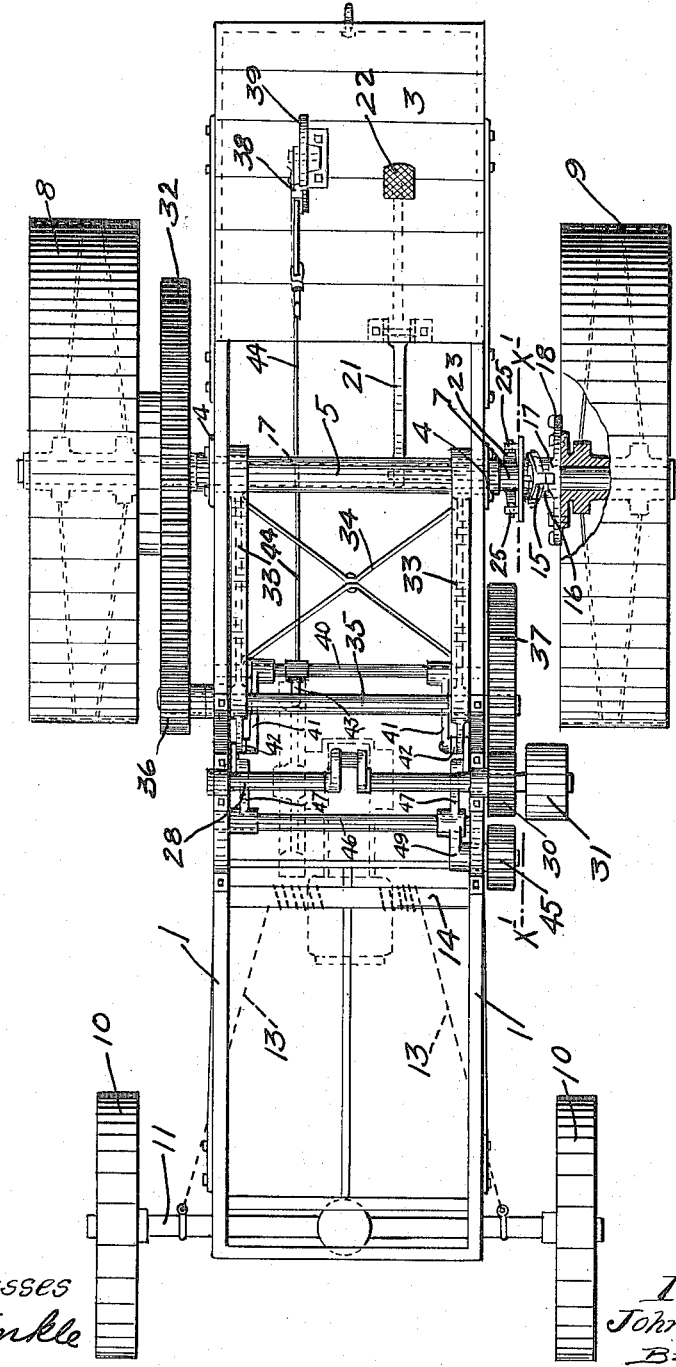

J. J. VISTE.
TRANSMISSION MECHANISM FOR TRACTORS.
APPLICATION FILED OCT. 30, 1914.
1,158,087.
Patented Oct. 26, 1915.
3 SHEETS—SHEET 3.
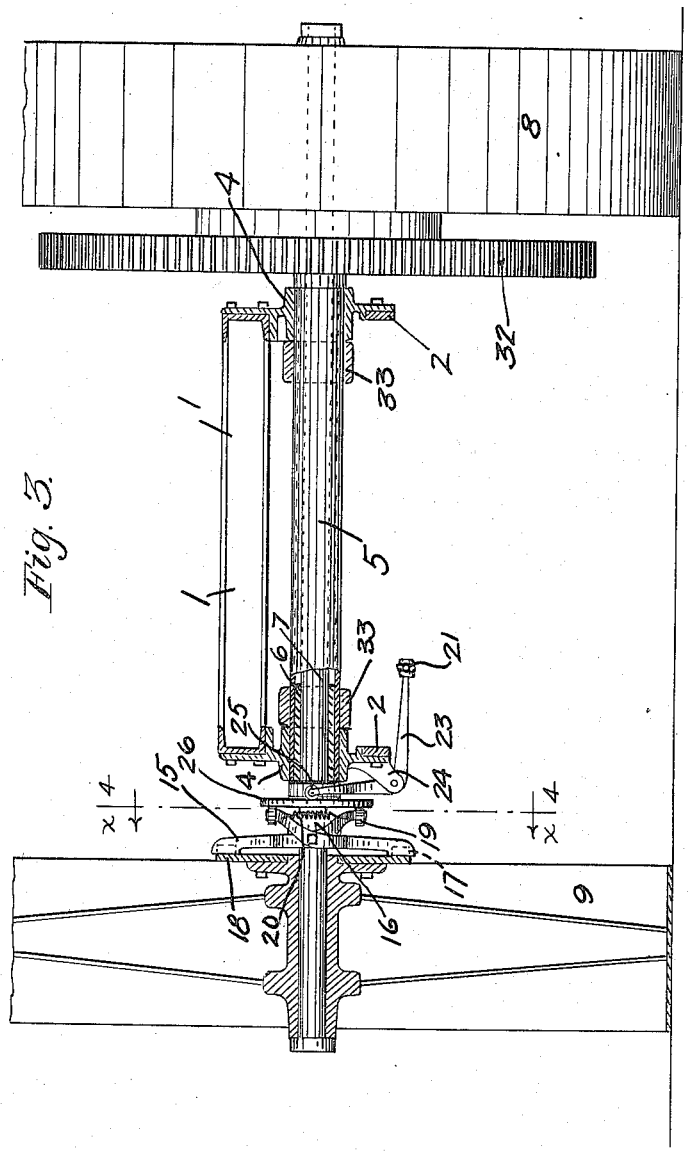
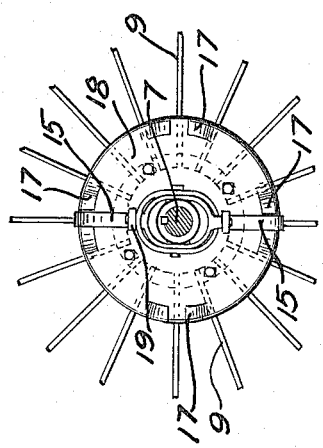

UNITED STATES PATENT OFFICE.

JOHN J. VISTE, OF ADA, MINNESOTA.

TRANSMISSION MECHANISM FOR TRACTORS.

1,158,087.     Specification of Letters Patent.     Patented Oct. 26, 1915.

Application filed October 30, 1914. Serial No. 869,410.

*To all whom it may concern:*

Be it known that I, JOHN J. VISTE, citizen of the United States, residing at Ada, in the county of Norman and State of Minnesota, have invented certain new and useful Improvements in Transmission Mechanism for Tractors; and I do hereby declare the following to be a full, clear, and exact description of the invention, such as will enable others skilled in the art to which it appertains to make and use the same.

My invention has for its object to provide an extremely simple and highly efficient transmission mechanism for tractors; and to this end, it consists of the novel devices and combinations of devices hereinafter described and defined in the claims.

In the accompanying drawings, which illustrate the invention, like characters indicate like parts, throughout the several views.

Referring to the drawings, Figure 1 is a side elevation of a tractor, having incorporated therein the improved transmission mechanism, some parts being indicated in different positions by means of broken lines, some parts being broken away, and other parts being sectioned on the line $x^1$ $x^1$ of Fig. 2; Fig. 2 is a plan view of the parts shown in Fig. 1, some parts being broken away and some of the exposed parts being shown in section; Fig. 3 is a view partly in rear elevation and partly in transverse vertical section, taken on the line $x^3$ $x^3$ of Fig. 1; and Fig. 4 is a detail view, partly in elevation and partly in section, taken on the line $x^4$ $x^4$ of Fig. 3.

The numeral 1 indicates the main frame of a tractor truck, which, as shown, is constructed of channel bars in rectangular arrangement. Suspended from this frame 1 is a supplemental skeleton frame 2, extended rearward of the main frame 1 to afford a support for a platform 3. A pair of heavy castings 4 is secured, one to each side of the frames 1 and 2, and have transversely alined openings, into which is telescoped and rigidly secured a tubular casing 5. Telescoped into each end of this casing 5 is a bearing sleeve 6. The rear axle 7 of the tractor is loosely journaled in the bearing sleeves 6 and has rigidly secured to its right hand end a traction wheel 8, and loosely journaled on its left hand end is a traction wheel 9.

The front end of the tractor frame 1 is supported on a pair of front wheels 10, journaled on the front axle 11, pivotally secured to said frame for horizontal swinging movement. A brace rod 12 connects the front axle 11 to the supplemental frame 2. The front wheels 10 are steered by the customary chains 13, attached to the front axle 11 and wound on a windlass shaft 14. Any suitable means, not shown, may be provided for rotating the shaft 14.

The traction wheel 9 is normally locked for rotation with the axle 7 by an extremely simple clutch mechanism, designed to take the place of the customary complicated differential mechanism. When the tractor is turning a corner, this clutch mechanism is operated to release the traction wheel 9 and allow the same to loosely rotate on the axle 7. The clutch mechanism includes a pair of crossed clutch levers 15, having divided, laterally bulged intermediate portions, embracing one another, and a collar 16, to which they are pivotally secured. This collar 16 is keyed for rotation with the axle 7. The outer ends of the clutch levers 15 are normally engaged between pairs of circumferentially spaced lugs 17, on a disk 18, bolted to the inner end of the hub of the traction wheel 9. The inner ends of the clutch levers 15 are equipped with antifriction rollers 19 and a coiled spring 20, anchored to the inner ends of said levers, tends to release the same from the lugs 17.

To release the levers 15, at will, from the lugs 17, is provided an intermediately fulcrumed operating lever 21, having at one end a foot treadle 22, which works through an opening in the platform 3 and projects thereabove. The other end of this lever 21 is secured to one of the arms of a bell crank 23, pivotally mounted between bearing lugs 24 on the casting 4, adjacent to the traction wheel 9. The other arm of the bell crank 23 is bifurcated and the prongs thereof are equipped with antifriction roller bearings 25. Interposed between the rollers 19 and 25 is a disk 26, having a hub, telescoped onto the axle 7 and free for rotary and sliding movements thereon. Obviously, by pressing downward on the foot treadle 22, the bell crank 23 is rocked into a position to move the disk 26 on the axle 7 into engagement with the rollers 19, to thereby rock the clutch levers 15 on their pivots and release the same from the lugs 17.

Mounted on the main frame 1 is an explosive engine, indicated as an entirety by the numeral 27, with the exception of the engine crank shaft 28, which is journaled in bearings 29 on said frame. The engine 27 is indicated in diagram by broken lines, and may be of the standard or any desired construction. To the left hand end of the engine crank shaft 28 is keyed a spur gear 30 and a belt pulley 31, the latter being located outward from the former. A large spur gear 32 is keyed to the shaft 7 and bolted, or otherwise rigidly secured, to the traction wheel 8.

Pivoted on the casing 5 for vertical swinging movement, concentric to the gear 32, is a pair of levers 33, which project forward and are rigidly connected for common swinging movement by brace rods 34. Loosely journaled in the outer ends of the levers 33 is a counter shaft 35, having keyed to its right hand end a relatively small intermediate spur gear 36, which is always in mesh with the gear 32 during the swinging movement of the levers 33. On the left hand end of the counter shaft 35 is keyed a relatively large intermediate spur gear 37, normally in mesh with the gear 30 on the engine crank shaft 28. The intermediate gear 37 is moved into and out of mesh with the gear 30 by vertically swinging the levers 33 while the intermediate gear 36 maintains its engagement with the gear 32.

To raise and lower the levers 33 and hold the same in different predetermined set positions, is provided a latch lever 38 and coöperating notched segment 39, mounted on the platform 3. The following connections are provided for connecting the latch lever 38 to the levers 33: In bearings on the under side of the supplemental frame 2 is journaled a rock shaft 40 having keyed thereto a pair of parallel forwardly projecting arms 41. There is one of these arms located directly under each of the levers 33. Longitudinally adjustable links 42 connect the arms 41 to the respective levers 33. A depending arm 43 is rigidly secured to the rock shaft 40, between the arms 41, and is connected to the intermediate portion of the operating lever 38 by a long link 44. Obviously, when the operating lever 38 is set in its full line position, as shown in Fig. 1, the intermediate gear 37 is in mesh with the gear 30 and motion is imparted from said gear 30, through the gear 37, rock shaft 35, and gears 36 and 32, to the traction wheel 8, to drive the tractor forward. When the lever 38 is moved into an extreme position, as indicated by broken lines in Fig. 1, the intermediate gear 37 is out of mesh with the gear 30, as shown by broken lines in Fig. 1.

To reverse the motion of the traction wheel 8 and thereby drive the tractor backward is provided a normally inoperative relatively small gear 45, arranged to be moved simultaneously into mesh with the gears 30 and 37 when said gear 37 is moved out of mesh with the gear 30, as shown by broken lines in Fig. 1. To support this reversing gear 45 and move the same into and out of mesh with the gears 30 and 37 are provided the following connections: Journaled in bearings on the under side of the main frame 1 is a rock shaft 46, having keyed thereto a pair of parallel rearwardly and upwardly projecting arms 47. These arms 47 are vertically alined, one with each lever 33, and connected thereto on the same pivots with the links 42, by links 48. Obviously, the pairs of connected links 42 and 48 afford toggles, the joints of which are pivotally connected to the levers 33. As shown, each link 42 comprises two members, connected by screw threads, whereby the same may be longitudinally adjusted to bring the intermediate gear 37 in its proper relation with the gear 30. Integrally formed with the left hand arm 47 is a third arm 49, which, together with the connected arm 47, affords a bell crank. The gear 45 is loosely journaled on a laterally projecting stud on the arm 49.

When the latch lever 38 is set in an intermediate position, both gears 37 and 45 are out of mesh with the gear 30, thereby allowing the tractor to stand still, and the engine 27 to be used to drive other machinery through a belt, not shown, arranged to run over the pulley 31.

A coiled spring 50, operative on the lever 21, is provided for yieldingly holding the foot treadle 22 in a raised position.

What I claim is:

1. In a tractor, the combination with an engine driven gear and a traction wheel gear, of relatively small and large intermediate gears, the former meshing with said traction wheel gear, means for moving said intermediate gears concentric to the axis of said traction wheel gear to carry said large intermediate gear into and out of mesh with said engine driven gear, a normally inoperative reversing gear, and means for moving said reversing gear into mesh with said engine driven gear and large intermediate gear, when said two gears are separated.

2. In a tractor, the combination with an engine driven gear and a traction wheel gear, of relatively small and large intermediate gears, the former meshing with said traction wheel gear, means for moving said intermediate gears concentric to the axis of said traction wheel gear to carry said large intermediate gear into and out of mesh with said engine driven gear, a rock shaft, a normally inoperative reversing gear carried by said rock shaft, eccentric to the axis thereof, and means for oscillating said rock shaft to carry said reversing gear into mesh with said engine driven gear and large intermediate gear, when said two gears are separated.

3. In a tractor, the combination with an engine driven gear and a traction wheel gear, of a pair of levers pivotally mounted at the axis of said traction wheel gear, a counter shaft journaled in said levers, relatively small and large intermediate gears on said counter shaft, said small intermediate gear being in mesh with said traction wheel gear, means for vertically moving said levers to carry said large intermediate gear into and out of mesh with said engine driven gear, a rock shaft, a normally inoperative reversing gear carried by said rock shaft eccentric to the axis thereof, and connections from said levers to said rock shaft for oscillating the same to move said reversing gear into mesh with said engine driven gear and large intermediate gear, when said two gears are separated.

4. In a tractor, the combination with an engine driven gear and a traction wheel gear, of a pair of levers pivotally mounted at the axis of said traction wheel gear, a counter shaft journaled in said levers, relatively small and large intermediate gears on said counter shaft, said small intermediate gear being in mesh with said traction wheel gear, means for vertically moving said levers to carry said large intermediate gears into and out of mesh with said engine driven gear, a bell crank, and a normally inoperative reversing gear journaled on one of the arms of said bell crank, the other arm of said bell crank being connected to said levers, whereby said reversing gear is moved into mesh with said engine driven gear and large intermediate gear, when said two gears are separated.

5. In a tractor, the combination with an engine driven gear and a traction wheel gear, of a pair of levers pivotally mounted at the axis of said traction wheel gear, a counter shaft journaled in said levers, relatively small and large intermediate gears on said counter shaft, said small intermediate gear being in mesh with said traction wheel gear, means for vertically moving said levers to carry said large intermediate gears into and out of mesh with said engine driven gear, a rock shaft, a bell crank on said rock shaft, a normally inoperative reversing gear journaled on one of the arms of said bell crank, and a link connecting the other arm of said bell crank to said levers, whereby said reversing gear is moved into mesh with said engine driven gear and large intermediate gear, when said two gears are separated.

6. In a tractor, the combination with an engine driven gear and a traction wheel gear, of a pair of levers pivotally mounted at the axis of said traction wheel gear, a counter shaft journaled in said levers, relatively small and large intermediate gears on said counter shaft, said small intermediate gear being in mesh with said traction wheel gear, a rock shaft, a pair of parallel arms on said rock shaft, links connecting said arms to said levers, means for oscillating said rock shaft, to carry said large intermediate gear into and out of mesh with said engine driven gear, a bell crank, a normally inoperative reversing gear journaled on one of the arms of said bell crank, and a link connecting the other arm of said bell crank to said levers, whereby said reversing gear is moved into mesh with said engine driven gear and large intermediate gear, when said two gears are separated.

7. In a tractor, the combination with an engine driven gear and a traction wheel gear, of a pair of levers pivotally mounted at the axis of said traction wheel gear, a counter shaft journaled in said levers, relatively small and large intermediate gears on said counter shaft, said small intermediate gear being in mesh with said traction wheel gear, a pair of rock shafts, an arm on each of said rock shafts, a toggle link pivotally connecting said arms, the joint of said toggle being pivotally connected to said levers, means for oscillating one of said rock shafts to carry said large intermediate gear into and out of mesh with said engine driven gear, and a normally inoperative reversing gear, carried by the other of said rock shafts, eccentric to the axis thereof, and arranged to be moved into mesh with said engine driven gear and large intermediate gear, when said two gears are separated.

8. In a tractor, the combination with an engine driven gear and a traction wheel gear, of a pair of levers pivotally mounted at the axis of said traction wheel gear, a counter shaft journaled in said levers, relatively small and large intermediate gears on said counter shaft, said small intermediate gear being in mesh with said traction wheel gear, a pair of rock shafts, an arm on each of said rock shafts, a toggle link pivotally connecting said arms, the joint of said toggle being pivotally connected to said levers, one of the members of said toggle being longitudinally adjustable, means for oscillating one of said rock shafts to carry said large intermediate gear into and out of mesh with said engine driven gear, and a normally inoperative reversing gear, carried by the other of said rock shafts, eccentric to the axis thereof, and arranged to be moved into mesh with said engine driven gear and large intermediate gear, when said two gears are separated.

9. In a tractor, the combination with an engine driven gear, and a traction wheel gear, of a pair of levers pivotally mounted at the axis of said traction wheel gear, a counter shaft journaled on said levers, relatively small and large intermediate gears on said counter shaft, said small intermediate gear being in mesh with said traction wheel gear, upper and lower rock shafts, a pair of parallel arms carried by each of said rock shafts, a pair of toggle links pivotally connecting the arms of said two rock shafts, the joints of said toggles being pivotally connected to said levers, a third arm on each of said rock shafts, an operating lever and a link connecting the same to the third arm of said lower rock shaft, for oscillating said rock shaft to raise and lower said levers and thereby carry said large intermediate gear into and out of mesh with said engine driven gear, and a normally inoperative reversing gear, carried on the third arm of said upper rock shaft and arranged to be moved into mesh with said engine driven gear and large intermediate gear, when said two gears are separated.

In testimony whereof I affix my signature in presence of two witnesses.

JOHN J. VISTE.

Witnesses:
JNO. M. HELLAND,
J. F. ADKINS.

Copies of this patent may be obtained for five cents each, by addressing the "Commissioner of Patents, Washington, D. C."